A. BAJLUK & G. BORLAN.
ELECTRIC TRAP.
APPLICATION FILED MAR. 7, 1911.
1,054,383.
Patented Feb. 25, 1913.
3 SHEETS—SHEET 2.
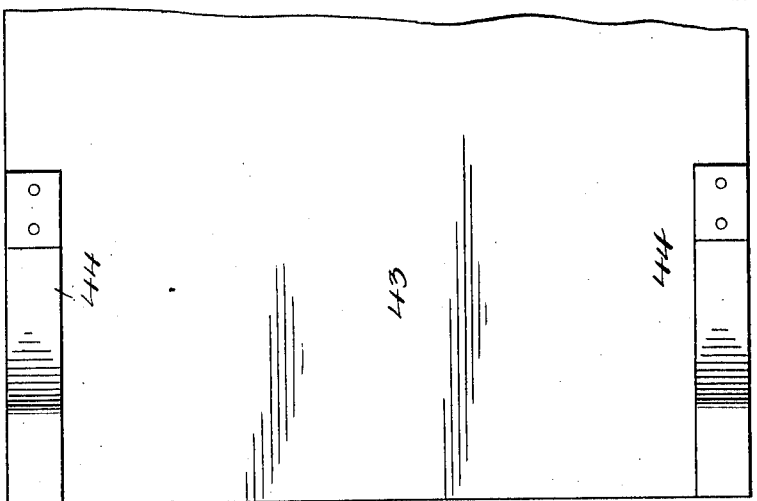
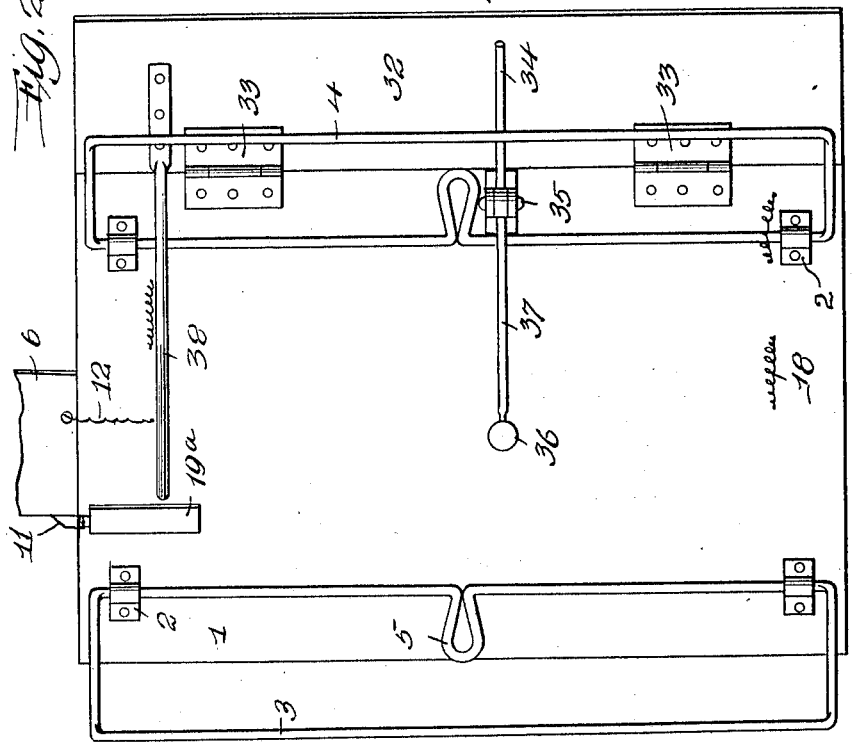
WITNESSES:
Samuel Payne
K. H. Butler
INVENTOR.S
A. Bajluk.
G. Borlan.
BY
ATTORNEYS

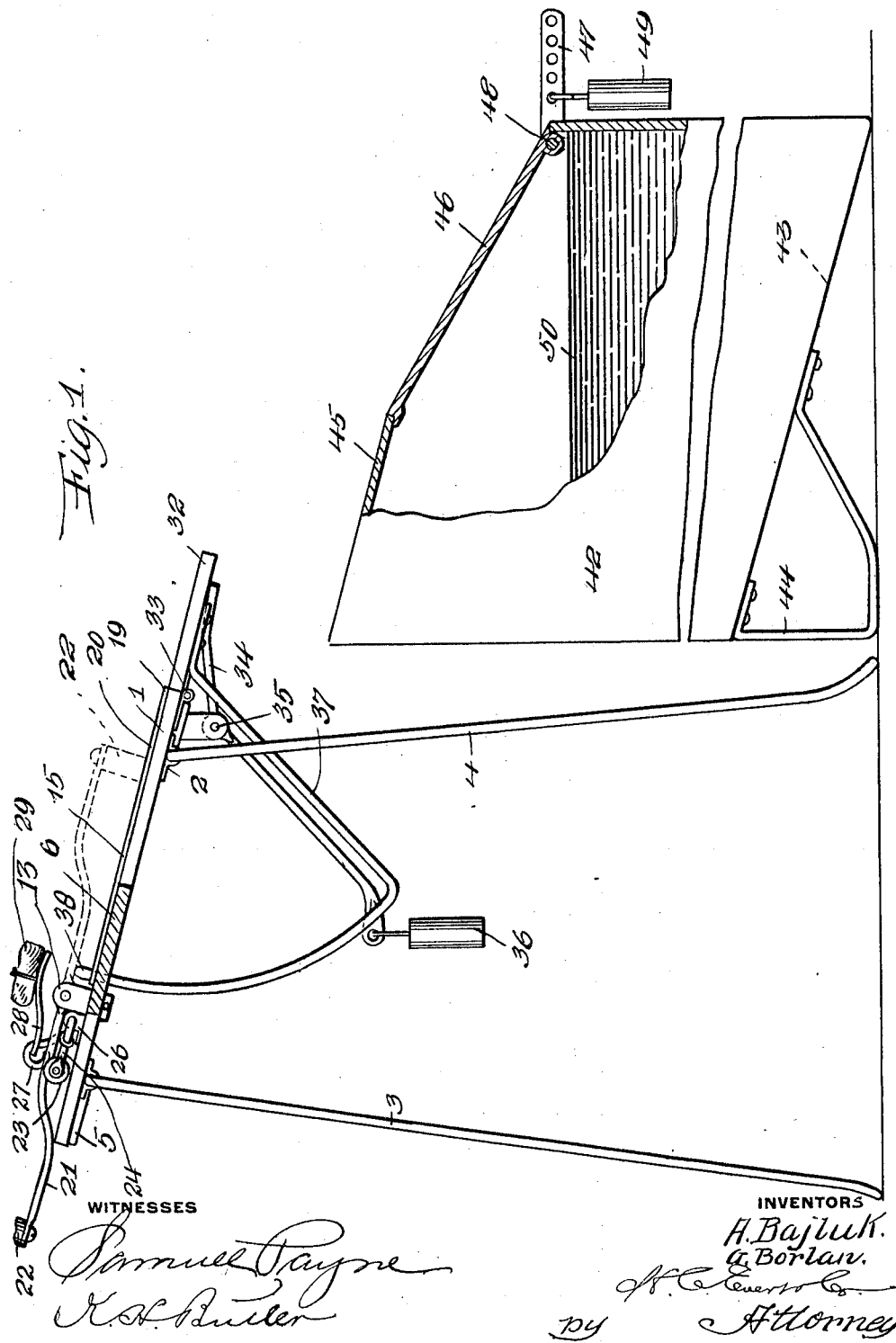

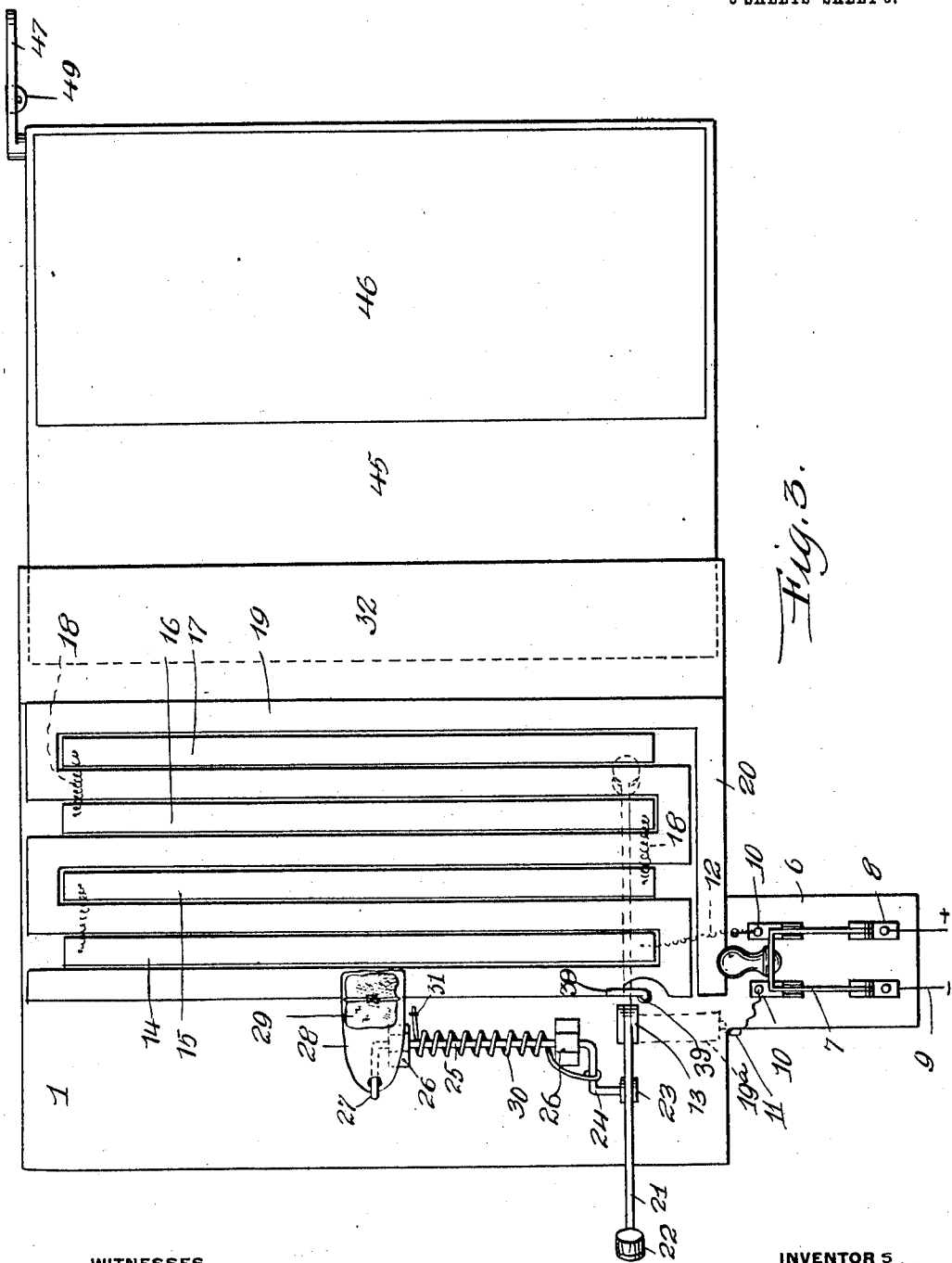

UNITED STATES PATENT OFFICE.

ADOLF BAJLUK AND GEORGE BORLAN, OF McKEESPORT, PENNSYLVANIA.

ELECTRIC TRAP.

1,054,383. Specification of Letters Patent. Patented Feb. 25, 1913.

Application filed March 7, 1911. Serial No. 612,908.

*To all whom it may concern:*

Be it known that we, ADOLF BAJLUK and GEORGE BORLAN, subjects of the King of Hungary, residing at McKeesport, in the county of Allegheny and State of Pennsylvania, have invented certain new and useful Improvements in Electric Traps, of which the following is a specification, reference being had therein to the accompanying drawing.

This invention relates to electric traps particularly designed for the extermination of rats and other rodents.

The primary object of the invention is to utilize an electric current for exterminating rats, and to provide a trap that can be safely used and automatically re-set.

Another object of the invention is to provide a trap that will collect the bodies of rodents after they have been electrocuted.

A further object of the invention is to accomplish the above results by a mechanical construction that is simple, durable and highly efficient for the purposes for which it is intended.

With the above and other objects in view, the invention resides in the novel construction, combination and arrangement of parts to be hereinafter specifically described and then claimed.

Reference will now be had to the drawings forming part of this specification, wherein like numerals of reference designate corresponding parts throughout the several views, in which:—

Figure 1 is a side elevation of the trap partly broken away and partly in section, Fig. 2 is a bottom plan of a portion of the trap, and Fig. 3 is a top plan of the same.

The reference numeral 1 denotes an elevated inclined platform made of an insulation material, as slate. The bottom of the platform is provided with straps 2, adjacent to the ends thereof, for legs 3 and 4, preferably made of wire, the leg 3 being of a greater height than the leg 4 to support the platform at an inclination, whereby rats that are electrocuted upon the platform will roll to the lower edge thereof. The legs 3 and 4 have the upper ends thereof provided with central looped portions 5 adapted to engage the under side of the platform and maintain the legs 3 and 4 at an inclination to firmly support the platform in an elevated position.

6 denotes an extension at one end of the platform 1 and mounted upon this extension is a conventional form of double knife switch 7. Connected to the posts 8 of the switch are wires 9 in circuit with a suitable source of electrical energy, as a generator (not shown). The binding posts 10 are connected to wires 11 and 12, the former extending under the platform 1 and connecting with the lower end of a bearing 13 mounted in said platform; this connection may be direct or through a plate $19^a$. The wire 12 extends through the extension 6 to the under side of the platform 1 and then is carried upwardly through said platform to a contact bar 14 mounted upon said platform. Associated with the contact bar 14 are bars 15, 16 and 17, said bars being connected together and to the bar 14 by wires 18 arranged upon the under side of the platform 1. The bars 14 to 17 inclusive are longitudinally disposed upon the platform 1 in parallelism, said bars being equally spaced to provide clearance for a sinuous bar 19 having a leg 20 that extends in proximity to the switch 7.

Pivotally connected to the bearing 13 is a switch arm 21 having the outer end thereof provided with a contact piece 22 adapted to engage the bar 19. The switch arm 21 normally rests upon a roller 23 revolubly supported by the crank 24 of a shaft 25, journaled in bearings 26, carried by the platform 1. The opposite end of the shaft has a crank 27 to which is connected a bait holder 28 having a piece of bait 29 suitably secured thereto. Encircling the shaft 25 is a coiled spring 30 having one end thereof secured to the platform, as at 31 and the opposite end connected to the crank 24. As will be seen in Fig. 3, the spring 30 normally retains the roller 23 in a rear position where it supports the contact arm 21, the bait-holder 28, in this position being raised. When the rodent, standing on the contact bars, nibbles the bait, the holder is drawn downward against the tension of the spring (the tension of the latter being comparatively light; its function being to return the bait-holder to normal position), rocking the shaft 25 and throwing the contact arm 21 forward a distance sufficient to pass beyond a perpendicular drawn through the arm pivot, from where the arm drops into contact with one of the bars 19, energizing the bars and providing the electrocuting circuit. As soon as the rodent is electrocuted, the pressure on the bait holder is removed and the spring returns the bait-holder and roller to normal position.

32 denotes an extension carried by the lower edge of the platform, said extension being hinged to said platform, as at 33. The extension is normally retained in alinement with the platform by a lever 34 pivotally mounted in a bearing 35, carried by the under side of the platform 1. The lower end of the lever 34 is provided with a small weight 36, said weight being sufficient to hold the extension 32 in alinement with the platform 1. The under side of the extension 32 has a rearwardly extending arm 37 with the upper end thereof bent upwardly upon an arc, as at 38 and extending through an opening 39 provided therefor in the platform 1. The upper end of the arm is preferably bent laterally and located at a point directly below the arm 21 when the latter has been thrown forward to contact position as above described. This particular arrangement provides for returning the contact 22 to its inoperative position, it being readily understood that as the rodent rolls off of the contacts of the electrocuting circuit, it depresses the extension 32 and raises the upper end of the arm 38, throwing the contact 22 to a point beyond the perpendicular from where it drops on to the roller.

42 denotes a metallic receptacle having an inclined bottom 43 supported by legs 44. The top of the receptacle is inclined, as at 45 and provided with a hinged lid 46, said lid being arranged to swing inwardly. The lid is normally retained in a closed position by an outwardly extending arm 47, carried by the pintle 48 of the lid, said arm having an adjustable weight 49. The receptacle is adapted to contain a suitable liquid 50.

What we claim is:—

1. A trap of the type described, comprising an elevated inclined platform, a source of electrical energy, bars mounted upon said platform and adapted to provide an electrocuting circuit when in circuit with said source of electrical energy, a pivoted switch arm carried by said platform and adapted to contact with one of said bars to complete an electrocuting circuit to said bars, a bait holder adapted to actuate said switch arm, a hinged extension carried by said platform and normally retained in alinement therewith, and means carried by said hinged extension and adapted to restore said switch arm to its normal position when said extension is lowered.

2. A trap of the type described, comprising an elevated inclined platform, a source of electrical energy, bars mounted upon said platform and adapted to provide an electrocuting circuit when in circuit with said source of electrical energy, a pivoted switch arm carried by said platform and adapted to contact with one of said bars to complete an electrocuting circuit to said bars, a bait holder adapted to actuate said switch arm, a hinged extension carried by said platform and normally retained in alinement therewith, means carried by said hinged extension and adapted to restore said switch arm to its normal position when said extension is lowered, and a receptacle having a hinged lid adapted to receive rodents from said hinged extension.

3. An electrical trap for rodents, comprising an elevated inclined platform, bars carried by said platform and adapted to provide an electrocuting circuit when in circuit with a suitable source of electrical energy, a switch arm pivotally supported by said platform and adapted to contact with one of said bars and complete an electrocuting circuit to said bars, a bait holder carried by said platform and adapted to actuate said switch arm, and means movably arranged at the lower edge of said platform and adapted to restore said arm to its normal position.

4. In an electric trap for rats, the combination with a suitable source of electrical energy, of an inclined insulated platform, contact bars carried by said platform and adapted to provide an electrocuting circuit when in circuit with said source of electrical energy, a switch arm pivotally mounted upon said platform and adapted to complete an electrocuting circuit to said bars, and a bait holder adapted to actuate said switch arm.

5. In an electric trap, a platform having bars forming electrodes of an electrocuting circuit, said circuit being normally inactive, a movable bait holder, a member movable into and out of contact with one of said bars to form a make and break device therewith for said circuit, and means for moving said member.

6. In an electric trap, a platform having bars forming electrodes of an electrocuting circuit, said circuit being normally inactive, a movable bait holder, a member movable into and out of contact with one of said bars to form a make and break device therewith for said circuit, and means for moving said member the movement of said member into contact being controlled by movements of the bait holder.

In testimony whereof we affix our signatures in the presence of two witnesses.

ADOLF BAJLUK.
GEORGE BORLAN.

Witnesses:
  MAX H. SROLOVITZ,
  JOSEPH DEUBSE.

Copies of this patent may be obtained for five cents each, by addressing the "Commissioner of Patents, Washington, D. C."